Jan. 7, 1941.　　　　C. B. MOORE　　　　2,227,600
MEASURING INSTRUMENT
Filed Dec. 14, 1939　　　2 Sheets-Sheet 1
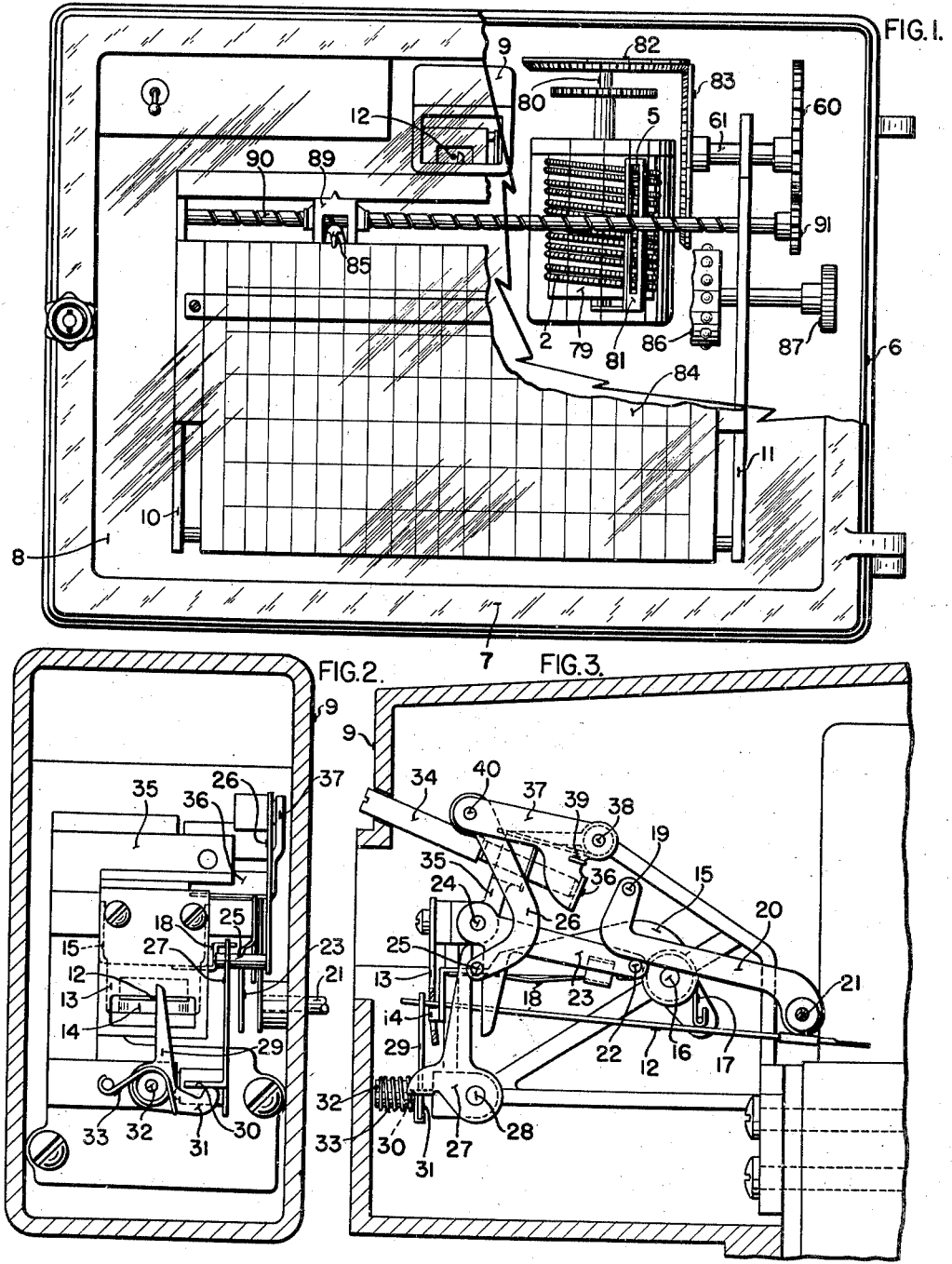
INVENTOR
COLEMAN B. MOORE
BY George Willumbaugh
ATTORNEYS Jan. 7, 1941.   C. B. MOORE   2,227,600
MEASURING INSTRUMENT
Filed Dec. 14, 1939   2 Sheets—Sheet 2

INVENTOR
COLEMAN B. MOORE
BY George H. Mumbaugh
ATTORNEYS

Patented Jan. 7, 1941

2,227,600

UNITED STATES PATENT OFFICE 2,227,600

MEASURING INSTRUMENT

Coleman B. Moore, Carroll Park, Pa., assignor to The Brown Instrument Company, Philadelphia, Pa., a corporation of Pennsylvania Application December 14, 1939, Serial No. 309,270

10 Claims. (Cl. 74—1)

The present invention relates to self-balancing potentiometers and more particularly to a mechanical relay mechanism whereby the potentiometer circuit may be rebalanced in response to unbalance thereof and a pen moved across a chart to a position proportional to the value of a condition being measured.

It is an object of the invention to provide a simple relay mechanism to convert the deflections of a measuring element into proportional movements of an adjusting member.

It is a further object of my invention to provide a mechanism for rebalancing a potentiometer in response to unbalance thereof in exact accordance with the amount of unbalance in a simple and efficient manner.

It is a further object of my invention to provide a relay mechanism for a potentiometer whose sensitivity may be adjusted while the instrument is operating without in any way interfering with the operation of the mechanism thereof.

The various features of novelty which characterize my invention are pointed out with particularity in the claims annexed to and forming a part of this specification. For a better understanding of the invention, however, its advantages and specific objects obtained with its use, reference should be had to the accompanying drawings and descriptive matter in which I have illustrated and described a preferred embodiment of the invention.

In the drawings:

Fig. 1 is a front view of my potentiometer mechanism with various parts broken away and other parts omitted for the sake of clearness;

Fig. 2 is a front view of the galvanometer clamping and detecting mechanism;

Fig. 3 is a side view taken from the right of Fig. 2;

Figure 4:
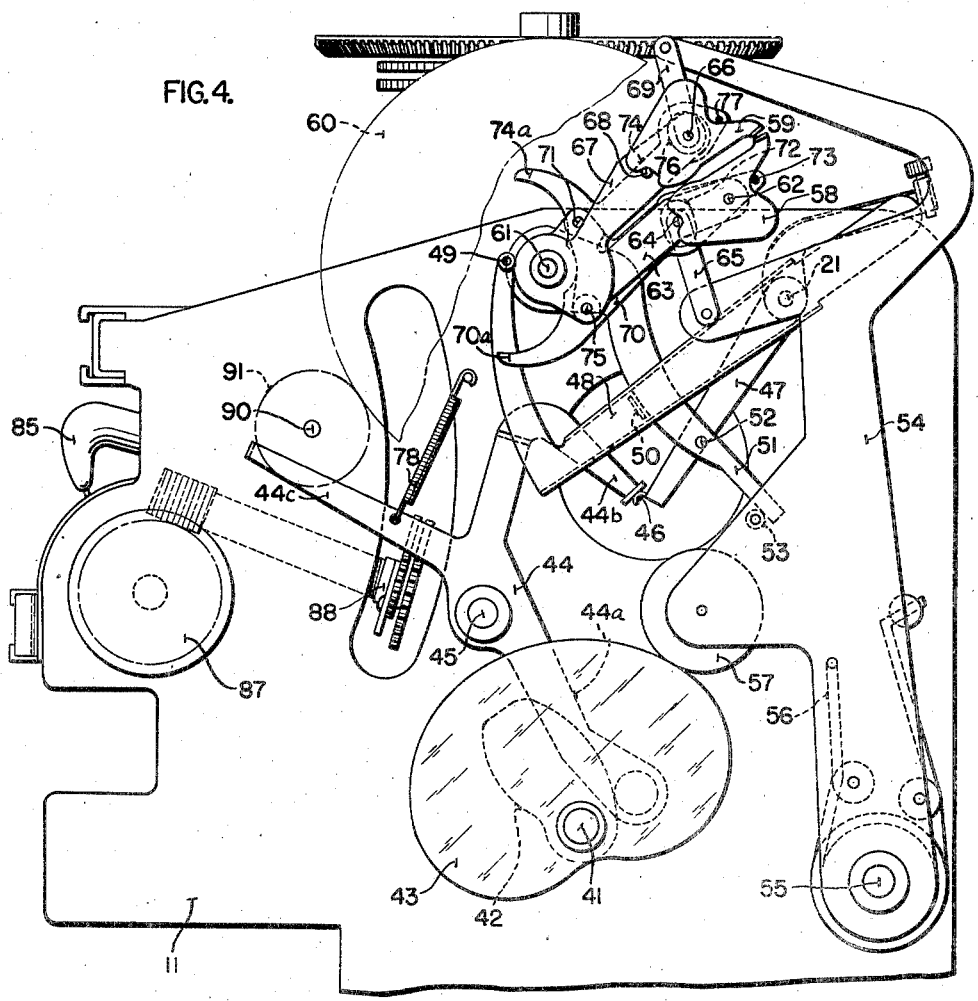
Fig. 4 is a view of the right-hand side plate and parts mounted thereon.
Figure 5:
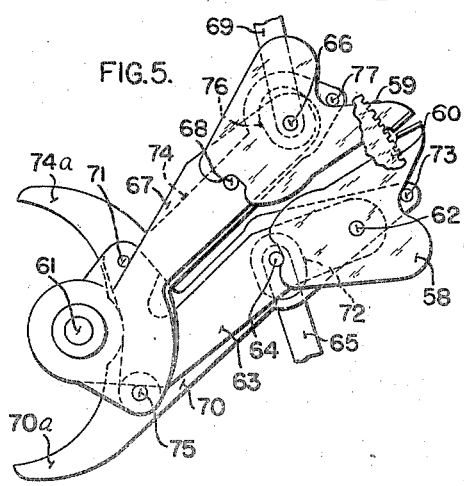
Fig. 5 is an enlarged view of the pawl mechanism.

Referring now to the drawings of which a detailed description will be made, there is shown a galvanometer which is connected in a potentiometric circuit with a thermocouple and a slide-wire.

Figure 6:
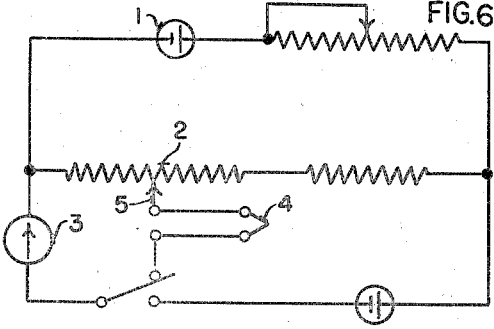
Fig. 6 is a wiring diagram of a potentiometer circuit.

Potentiometric circuits of the type contemplated herein are well known, such, for example, as disclosed in the Harrison Patent 1,898,124, and include, as is shown diagrammatically in Fig. 6, a known source of voltage 1 impressed across a resistor 2, commonly termed the instrument slide-wire, the galvanometer 3 and source of variable voltage, such as a thermocouple 4, being connected in series to oppose the known voltage across a variable portion of said resistor 2. The portion of the resistor 2 in circuit is determined by the position of a contact 5 along the slide-wire, the slide-wire and contact being relatively movable. When the variable voltage, for a given adjustment of the slide-wire, is equal and opposite to the known voltage, the galvanometer is in its null position, but on an increase above or decrease below the known voltage of the unknown voltage, the galvanometer will be deflected in one direction or the other respectively proportionately to the magnitude of the increase or decrease. This invention is concerned with the means by which deflections of said galvanometer control slide-wire adjustments to continuously rebalance the potentiometer system, and move an indicator which may take the form of a pen to make a record of the changes in the value of the condition.

The elements of the potentiometer circuit along with the rebalancing and recording mechanism are conveniently located in a casing 6 having a door 7 that is provided with a window 8 through which various of the elements of the mechanism may be viewed. The galvanometer clamping mechanism is located in a separate housing 9 within the case 6 to protect it from dust and undesirable fumes that may enter the case when the door is opened for the purpose of changing the chart or making necessary adjustments. Also located within the casing are a pair of side plates 10 and 11 which serve to support mechanism to be later described.

A pointer 12 (Figs. 2 and 3) of the galvanometer 3 is periodically clamped between a stationary abutment 13 and a movable abutment 14 that is vertically under 13 and forms part of a lever 15, pivoted at 16 and biased in a clockwise direction by spring 17. The lever 15 is periodically given counter-clockwise movements around its axis to free the pointer 12 so that the latter may assume a position dependent upon the circuit unbalance. These periodic movements are given by means of engagement between a spring member 18 attached to the lower portion of the lever 15 and a pin 19 in the end of a lever 20 that is attached to and moves with a shaft 21.

As the lever 20 moves in a counter-clockwise direction, prior to the time pin 19 engages the spring 18, the lower edge of the lever will engage a pin 22 in the end of an arm of bell-crank 23 that is pivoted at 24. The second arm of the bell-crank 23 acts, through a pin 25 on lever 26, to move a lever 27, pivoted at 28, in a counter-clockwise direction. A feeler 29, that is adapted to engage the galvanometer pointer 12 and measure its position, is moved away from the pointer to permit the latter to assume a new position, by the counter-clockwise movement of lever 27. This is accomplished by means of a bent over arm 30 on the lever 27 that engages an arm 31 on the feeler to move the latter around its pivot 32 against the tension of spring 33.

By the time arm 20 has moved pin 22 sufficiently to shift feeler 29 completely out of the path of deflection of pointer 12 the pin 19 will engage spring 18 to move the abutment 14 downwardly enough to free the pointer so that it can assume its new position. The force which moved lever 20 counter-clockwise is then removed and the parts return under the action of springs 17 and 33. On their return movement the lever 15 under force of the spring 17 acts to clamp the pointer between abutments 13 and 14.

Movement of feeler 29 and levers 27, 23 and 20 continues under the action of spring 33 until the feeler 29 engages the pointer 12, at which point they are stopped. The lever 20 is then in a position corresponding to the position of the pointer 12.

In order to change the sensitivity of this feeler mechanism or the ultimate position of lever 20 for a given position of the pointer 12 it is only necessary to shift the position of pin 25 with respect to the point at which it engages levers 23 and 27. If pin 25 is moved downwardly movement of bell-crank 23 is decreased with respect to movement of lever 27 and vice versa. This adjustment is valuable since it permits the instrument to be adjusted for galvanometers of various sensitivities and for slight variations in the voltages curves of different thermocouples. This adjustment may be made easily and accurately while the instrument is in operation without disturbing any of the operating parts by merely rotating a screw member 34 that extends through the front of the mechanism housing 9. The screw is in threaded engagement with a stationary support 35 and has its right end acting against a bent over arm 36 on a lever 37 that is pivoted at 38 and biased in a clockwise direction by a spring 39. This lever has a stud shaft 40 on its outer end that acts as a movable pivot point for the lever 26 supporting pin 25. As the screw 34 is moved toward the right the pin 25 will be lowered to change the amount of movement imparted to bell-crank 23 for a given movement of the lever 27.

The manner in which shaft 21 is given its counterclockwise movements and the manner in which the clockwise movements thereof are used to control the action of the relay mechanism will now be described with reference to Fig. 4.

Extending through the side plate 11 is a shaft 41 that is driven at some suitable constant speed by a motor, not shown. This shaft has two cams 42 and 43 attached to it the former of which engages a roller on one arm 44a of a multiple armed lever 44 to oscillate this lever around its pivot 45. Oscillating motion is imparted to the shaft 21, which extends through the housing 9 and side plate 11, by means of the engagement between a projection 46 on an arm 47 attached to the shaft and an arm 44b of the lever 44. As the cam 42 rotates arm 47 is first moved counter-clockwise to rotate the shaft 21 in a direction to move feeler 29 away from the pointer 12 and to unclamp the pointer. Continued rotation of the cam will then permit the shaft to rotate clockwise under the bias of spring 33, as previously described, until feeler 29 engages the pointer 12. The shaft 21 is then stopped with arm 47 positioned at a point proportional to the deflection of the pointer 12. At this time arm 44b merely recedes from the arm 47.

The arm 47 is used to position a secondary pointer 48 which is journaled on shaft 21 and is L-shaped with a pin 49 in its outer end. The secondary pointer 48 is held in position by the engagement between a projection 50 thereon and a brake member 51. This brake is periodically released just before the arm 47 starts its upward excursion and is reapplied after arm 46 has reached its highest position. A pin 52 extends from the side of the brake to limit the downward movement of the secondary pointer.

The brake 51 is applied and released in timed relation to the movement of arm 47 by means of a pin 53 on a pawl actuating lever 54 that is moved around its pivot 55 by the cam 43. This lever is biased by a spring 56 in a counter-clockwise direction and is moved in a clockwise direction by means of engagement between a cam roller 57 attached to it and the cam 43. As the lever moves clockwise it returns a pair of driving pawls 58 and 59 to their starting position in addition to releasing brake 51 just prior to the end of its stroke. Upon counter-clockwise movement of lever 54 the brake 51 is first applied to secondary pointer 48 and then the driving pawls are started on their work stroke which is terminated when roller 57 reaches the low portion of cam 43.

The driving pawls on their work stroke are adapted to engage one of the teeth in a large gear wheel 60 that is attached to a shaft 61. The point along the work stroke at which the pawls engage the gear determines the amount of rotation that is imparted thereto and the pawl that engages the gear determines its direction of rotation. Pawl 58 rotates gear 60 clockwise and pawl 59 rotates it counter-clockwise.

The pawl 58 is pivoted at 62 on a pawl carrying arm 63 that is journaled on shaft 61. The pawl normally has a gravity bias around its pivot 62 in a clockwise direction and is limited in movement by a pin 64 on the arm 63. The outer end of arm 63 is connected by a link 65 to an arm on lever 54. The second pawl 59 is pivoted at 66 to a second pawl carrying arm 67, also journaled on shaft 61. The pawl 59 has a gravity bias counter-clockwise to a position limited by a pin 68 on the arm 67. The outer end of arm 67 is connected by a link 69 to a second arm on lever 54.

This arrangement is such that as the lever 54 moves counter-clockwise under the bias of spring 56 the pawls will be moved by their supporting arms around shaft 61 as a center. Normally the pawls do not engage the gear, but at some portion of their stroke, depending upon the position of pin 49 on the secondary pointer, one of the pawls will be moved into engagement with the gear to rotate it an amount depending upon the position of pin 49. This is accomplished by having a lever 70 pivoted at 71 to the arm 63. This lever has a lower curved end 70a, is provided with an opening 72 that surrounds the point at which the link 65 is attached to arm 63 and has a pin 73 at its upper end that is adapted to force pawl 58 toward gear 66. In a like manner a lever 74 is pivoted at 75 to arm 67. This lever is provided with a lower curved end 74a, has an opening 76 that surrounds pivot 66 and has a pin 77 adapted to force the tooth of pawl 59 into engagement with gear wheel 60.

The operation of the mechanism so far described is as follows. The parts are shown in Fig. 4 in the position they will assume just after brake 51 has been released and before secondary pointer 48 has dropped against pin 52. Rotation of the cam 42 in a clockwise direction will then move lever 44 so that arm 47 can rise under the bias of spring 33 until the feeler 29 is stopped by engagement with pointer 12. During this time the projection 46 on arm 47, which also underlies secondary pointer 48, has lifted 48 to a position corresponding to that of pointer 12. At this time the radius of cam 43 decreases sufficiently for the brake 51 to be applied to part 50 of the secondary pointer to hold the latter in place. Cam 42 now quickly permits the lever 43 to rotate clockwise under the bias of spring 78 to move arm 47 to its lowest position. This, by means of shaft 21 and lever 20, moves the feeler 29 away from the pointer and causes abutment 14 to be lowered to permit the pointer 12 to swing free. At the same time that lever 44 is turning clockwise, cam 43 is permitting the lever 54 to move counter-clockwise under the bias of spring 56. This movement, through links 65 and 69 and through arms 63 and 67, carries the pawls 58 and 59 around the edge of gear 60. If the galvanometer pointer was in its neutral position the pin 49 will be in the position shown and no movement will be imparted to the gear. If, however, the pointer was deflected, for example, to the left of its mid-position in Fig. 2 the pin 49 will be located above its position of Fig. 4 and will be in the path of end 74a of lever 74. Therefore, when arm 67 has moved sufficiently for 74a to engage 49, the lever 74 will pivot around 75 causing pin 77 to force the tooth of pawl 59 into engagement with a tooth of gear 60. For the rest of the movement of arm 67 the pawl 59 will rotate gear 60. It will be obvious that the further displaced the pointer 12 is from its midposition, the sooner in the cycle pawl 59 will begin rotating gear 60. For a deflection of the pointer 12 to the right of its mid-position in Fig. 2 the pin 49 will be moved to a position in which it will be engaged by arm 70a. This, by means of pin 73, will force pawl 58 into engagement with gear 60 to rotate that gear clockwise an amount depending upon the amount of deflection of pointer 12 from its midpoint. If the secondary pointer 48 was not in its mid-position it will be forced back to that position on each cycle by either arm 70a or 74a engaging pin 49. The brake 51 is weak enough to permit this action to take place.

As has been described above the gear 60 is periodically rotated an amount proportional to the deflection of the galvanometer. This rotation is used to move the contact 5 along the slide-wire 2 and to shift a pen along a chart in order to make a record of the value of the condition being measured.

The slide-wire 2, in the instrument, takes the form of a coil of wire that is helically wrapped around a core 79 which is supported on a suitable portion of the instrument. Journaled in this core is a shaft 80 that has on its lower end a bracket 81 that extends around the core and up the outside thereof in proximity to the slide-wire. The contact 5 is carried by this bracket and as the shaft 80 is rotated the contact travels around the slide-wire following a helical path from the top to the bottom thereof to bring more or less resistance into the galvanometer circuit. Shaft 80 is rotated by means of a gear 82 on its upper end that meshes with another gear 83 that is on the shaft 61 to which the gear 60 is attached. Therefore, as gear 60 is rotated the contact 5 will be shifted along the slide-wire 2 to rebalance or tend to rebalance the potentiometer circuit.

A chart 84 to receive a record of the value of the condition being measured is mounted in the instrument and is moved past a pen 85 at a suitable rate by means of a chart drive roll 86 that is journaled in the side plates 10 and 11. This roll is provided with a knob 87 by which it may be rotated by hand, but is normally driven through a ratchet and gear mechanism 88 driven intermittently from an arm 44c of the lever 44.

The pen 85 is mounted in a carriage 89 that is in threaded engagement with a helically threaded shaft 90 journaled in the side plates 10 and 11. The shaft 90 is rotated by means of a gear 91 on its outer end which meshes with the gear 60. Therefore, as the gear 60 rotates the shaft 90 will be rotated to move the pen across the chart to a position corresponding to the value of the condition being measured.

While in accordance with the provisions of the statutes, I have illustrated and described the best form of my invention now known to me, it will be apparent to those skilled in the art that changes may be made in the form of the apparatus disclosed without departing from the spirit of my invention as set forth in the appended claims, and that in some cases certain features of my invention may sometimes be used to advantage without a corresponding use of other features.

Having now described my invention, what I claim as new and desire to secure by Letters Patent is:

1. In a measuring instrument, the combination of an element movable in response to variations in the value of a measurable condition, means to measure the position of said element, a member set in accordance therewith, a driven member, a pair of drive members each adapted to drive said driven member in a given direction, means to move said driving members through a path normally out of contact with said driven member and means operated by said member to cause engagement between one of said drive members and said driven member depending upon the position of the member.

2. In a measuring instrument, the combination with an element deflectable in accordance with variations in the value of a measurable condition, means to measure the position of said member comprising a first lever moved through a path into a position determined by the position of said element, a second lever moved by said first lever, apparatus operated in accordance with the position assumed by said second lever, and means to vary the position of said second lever with respect to a given position of said first lever comprising a thrust connection between the two levers and means to shift said thrust connection while said levers are in operation.

3. In a measuring instrument, the combination of an element movable in response to variations in a measurable condition comprising a first lever oscillatable from a predetermined position to a position determined by said element, a second lever moved by said first lever to a position determined by that of the first lever, means to vary the movement of the second lever in response to a given movement of the first lever comprising a pivoted thrust member between the two levers and means to shift the pivot of said thrust member while the levers are operating.

4. In a measuring instrument, an element deflecting in response to variations in the value of a measurable condition, means to periodically hold said element in position, a feeler periodically moved from a predetermined point through a path in which it will be stopped by said element, mechanism to be operated in accordance with the position in which said element is engaged by said feeler and a sensitivity adjustment for said mechanism operable to change the relation between said feeler and mechanism while they are in motion.

5. In a measuring instrument, an element deflectable in response to variations in the value of a measurable condition, a lever positioned in accordance with the position of said element, a secondary element periodically moved by said lever, means to maintain said secondary element in position, a driven member, a pair of driving members, means to move said driving members through a path adjacent said driven member, and means operated by said secondary element to move one of said driving members into driving relation with said driven member.

6. In a measuring instrument, a driven member, a pair of driving members, pivoted supports for said driving members, means to move said supports and driving members through a path adjacent said driven member, a lever carried by each support to move its driving member into driving relation with said driven member, an element positioned in accordance with the value of a measurable condition on either side of a neutral position and when on either side of said neutral position being in the path of one of said levers, whereby as one of said levers engages said element its driving member will be moved into position to drive said driven member.

7. In a measuring instrument, a driven member, a pair of driving members normally out of engagement with said driven member, means to move said driving members through a circular path in opposite directions around said driven member, means moved with each of said driving members adapted to move the latter into driving relation with said driven member, an element deflectable to a position determined by the value of a condition, a secondary element positioned by said element in the path of said means moving with said driving members to obstruct the movement of the same and cause one of said driving members to drive said driven member.

8. In a measuring instrument, an element positioned in accordance with the value of a condition, a secondary element positioned by said element, a driven member, a pair of driving members movable in opposite directions through paths adjacent said driven member, means operated in accordance with the position of said secondary element to move one of said driving members into driving engagement with said driven member and means to adjust the relation of said secondary element with respect to said element while said members are operating to change the point at which the driving member will be moved into engagement with said driven member for a given position of said element.

9. In a measuring instrument, an element movable to a position corresponding to the value of a measurable condition, a feeler biased toward a position determined by the position of said element, an arm moved by said feeler in its biased direction, means to move said arm and feeler in the opposite direction to predetermined positions, a secondary element, means to hold said secondary element in an adjusted position, means acting in timed relation with the means to move said arm to release said holding means and permit said secondary element to move to a predetermined position, and means on said arm to reposition said secondary element as said feeler and arm are moved in their biased direction.

10. In a measuring instrument, an element deflectable in accordance with the value of a measurable condition, a feeler periodically moved from a predetermined end position to a position determined by engagement with said element, mechanism periodically adjusted by said feeler from a predetermined end position to a position determined by that of said feeler when in engagement with said element, and means to adjust the range of movement of said mechanism with respect to that of said feeler while they are in motion.

COLEMAN B. MOORE.